(12) United States Patent
Lindholm

(10) Patent No.: US 9,981,591 B2
(45) Date of Patent: May 29, 2018

(54) SYSTEM FOR LIFTING AND LAUNCHING A BOAT

(71) Applicant: Almas Solutions Oy, Turku (FI)

(72) Inventor: Johan Lindholm, Turku (FI)

(73) Assignee: Almas Solutions Oy, Turku (FI)

( * ) Notice: Subject to any disclaimer, the term of this patent is extended or adjusted under 35 U.S.C. 154(b) by 0 days. days.

(21) Appl. No.: 15/080,635

(22) Filed: Mar. 25, 2016

(65) Prior Publication Data
US 2016/0280120 A1 Sep. 29, 2016

(30) Foreign Application Priority Data
Mar. 27, 2015 (FI) ...................................... 20155218

(51) Int. Cl.
| | |
|---|---|
| *B60P 3/10* | (2006.01) |
| *B63C 3/12* | (2006.01) |
| *B60P 1/54* | (2006.01) |
| *B63C 15/00* | (2006.01) |

(52) U.S. Cl.
CPC ............... *B60P 3/1033* (2013.01); *B60P 1/54* (2013.01); *B60P 3/1075* (2013.01); *B63C 3/12* (2013.01); *B63C 15/00* (2013.01)

(58) Field of Classification Search
CPC ..... B60P 3/1033; B60P 3/1016; B60P 3/1075; B60P 1/54; B60P 1/483; B63C 15/00; B63C 3/12; B63C 13/00
USPC ............ 405/1, 2, 3, 4, 7; 414/462, 483, 469, 414/678, 812
See application file for complete search history.

(56) References Cited

U.S. PATENT DOCUMENTS

| | | | |
|---|---|---|---|
| 3,777,922 | A | 12/1973 | Kirchmeyer |
| 3,930,584 | A | 1/1976 | Davis et al. |
| 4,087,014 | A | 5/1978 | Schadle |
| 4,113,126 | A | 9/1978 | Shotwell |

(Continued)

FOREIGN PATENT DOCUMENTS

| | | |
|---|---|---|
| AU | 7232581 A | 1/1982 |
| AU | 579841 B2 | 12/1988 |

(Continued)

OTHER PUBLICATIONS

Search Report, Finnish Patent and Registration Office, Application No. 20155218, dated Nov. 10, 2015, 1 page.

(Continued)

*Primary Examiner* — Carib A Oquendo
(74) *Attorney, Agent, or Firm* — Ziegler IP Law Group, LLC

(57) ABSTRACT

A device for launching and lifting a boat has a frame that includes at least a first frame part having a first end and a second end, at least a first cross-structure coupled with the first frame part essentially perpendicular to it and at a distance B1 from the first end of the first frame part, at least a first boat guide arranged on the first frame part at a distance C1 from the first end of the first frame part; and at least a first actuator arranged to be coupled with the first frame part at a distance D from the first end of the first frame part, at least one counterpart, and means for attaching the frame to the counterpart, wherein the first actuator is arranged to be coupled with the counterpart for enabling movement of the frame between a first position and a second position.

18 Claims, 10 Drawing Sheets

(56) References Cited

U.S. PATENT DOCUMENTS

| | | | |
|---|---|---|---|
| 4,828,186 A * | 5/1989 | Weiss | B63H 20/36 |
| | | | 248/640 |
| 5,586,856 A * | 12/1996 | Springer | B60P 3/10 |
| | | | 414/462 |
| 5,888,019 A | 3/1999 | Quastad | |
| 6,575,487 B1 | 6/2003 | Krause | |
| 2001/0015295 A1 | 8/2001 | Braun | |
| 2009/0302572 A1 * | 12/2009 | Bryant, II | B60P 3/1066 |
| | | | 280/414.1 |
| 2011/0008139 A1 * | 1/2011 | Hey | B60L 1/003 |
| | | | 414/495 |

FOREIGN PATENT DOCUMENTS

| | | |
|---|---|---|
| DE | 2642562 A1 | 2/1978 |
| FR | 2636912 A1 | 3/1990 |
| JP | S6025881 A | 2/1985 |
| WO | 9205101 A1 | 4/1992 |

OTHER PUBLICATIONS

Extended European Search Report, Application No. 16161401.1-1751, dated Aug. 10, 2016, 7 pages.

\* cited by examiner

SYSTEM FOR LIFTING AND LAUNCHING A BOAT

FIELD OF THE INVENTION

The present invention relates to a device for launching and lifting a boat. The system is especially suitable for small, open boats. The invention also relates to a system comprising the device, a boat and a storing device of the boat.

BACKGROUND AND SUMMARY OF THE INVENTION

Conventionally boats are transported and stored in their normal keel side down position. This applies usually to boats in the length of 4-8 meters. For storage and maintenance purpose on land, smaller light weighted boats are turned around their longitudinal axis by hand, thus the boats are stored keel side up. Boats longer than 7 to 8 meters are usually so heavy that heavy duty equipment are needed for handling the boat in connection with lifting the boat from water and launching the boat to water.

Some solutions to the problem of lifting to and launching a boat from upside down position are known from patent literature, but they are typically limited in boat sizes and include major remodeling of the transporting device or the boat.

It is thus an aim of the present invention to provide a device for launching and lifting of a boat, that overcomes the prior art problems. An aim is to provide a device that allows an easy handling of the boat, without the need for excessive force, thus allowing it to be handled also by a single person.

The present description relates to a device for launching and lifting a boat, comprising
  a frame comprising
    at least a first frame part having a first end and a second end,
    at least a first cross-structure coupled with the first frame part essentially perpendicular to it and at a distance B1 from the first end of the first frame part,
    at least a first boat guide coupled with the first frame part at a distance C1 from the first end of the first frame part,
  at least a first actuator arranged to be coupled with the first frame part at a distance D from the first end of the first frame part,
  at least one counterpart,
  means for attaching the frame to the counterpart,
  wherein the first actuator is arranged to be coupled with the counterpart for enabling movement of the frame between a first position and a second position.

The present description also relates to a system comprising
  a device for launching and lifting a boat according to the present description,
  a boat arranged along the first frame part,
  a storing device for the boat selected from the group consisting of a dock, a shore docking station and a boat trailer,
wherein the counterpart of the device for launching and lifting the boat is arranged on the storing device.

DETAILED DESCRIPTION OF THE INVENTION

Figure 1:
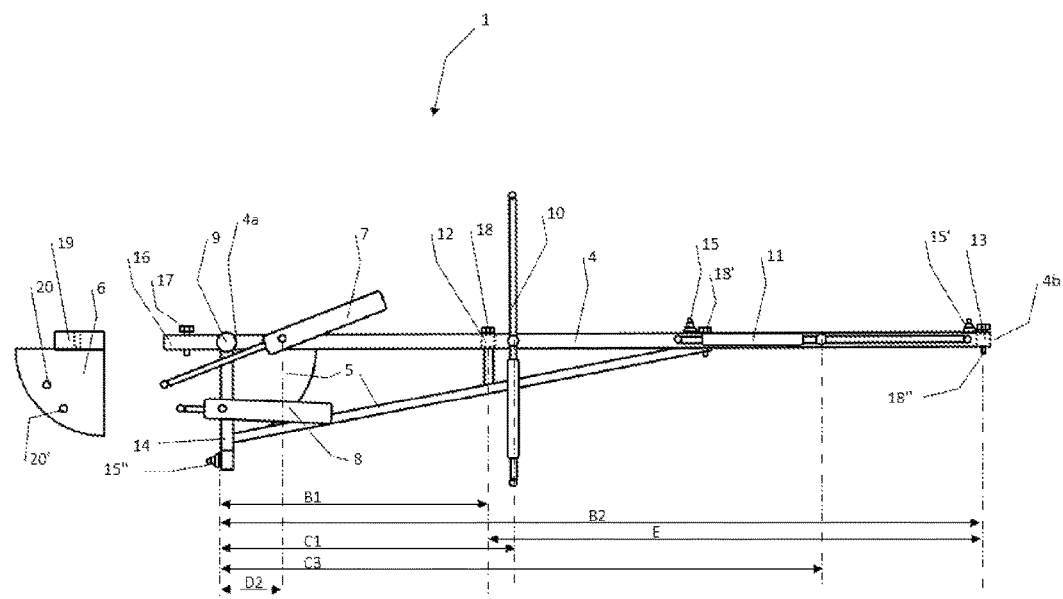
FIG. 1 schematically shows a device according to an embodiment of the present disclosure as a side-view.

The present description relates to a device for launching and lifting a boat, comprising
  a frame comprising
    at least a first frame part having a first end and a second end,
    at least a first cross-structure coupled with the first frame part essentially perpendicular to it and at a distance B1 from the first end of the first frame part,
    at least a first boat guide coupled with the first frame part at a distance C1 from the first end of the first frame part,
  at least a first actuator arranged to be coupled with the first frame part at a distance D from the first end of the first frame part,
  at least one counterpart,
  means for attaching the frame to the counterpart,
  wherein the first actuator is arranged to be coupled with the counterpart for enabling movement of the frame between a first position and a second position.

The present device thus provides optimal storage and transportation of boat in its upside down position. Means for transferring boat from upside down position further (i.e. launching), and back (i.e. lifting), is provided. Indeed, the device can be applied for upside down storage of boat on trailer, on a shore docking station or even on a pier. The device also enables low cost manufacturing of boat as will be described in more detail below. The device has also other uses and is indeed a versatile device, as will be described below.

By the first end of the frame part in this description is meant the end of the frame part that is towards the rear of the boat when the device is in use. The second end is thus the opposing end of the frame part, as the frame part typically has a longitudinal shape, i.e. its length is larger than its width.

The distance C, i.e. the distance the boat guide is arranged from the first end of the frame part may be for example 5 to 95% of the total length of the frame part. The distance can be for example from 5, 10, 15, 20, 25, 30, 35, 40, 45, 50, 55, 60, 65, 70, 75, 80, 85 or 90% of the total length of the frame part up to 10, 15, 20, 25, 30, 35, 40, 45, 50, 55, 60, 65, 70, 75, 80, 85, 90 or 95% of the total length of the frame part. Typically, when one boat guide is used, the distance C is between 30-60% of the total length of the frame part. This thus applies to all distances C where appropriate, i.e. to C1, C2 etc.

The distance B, i.e. the distance the cross-structure is arranged from the first end of the frame part may be for example 0 to 95% of the total length of the frame part. The distance can be for example from 0, 2, 5, 10, 15, 20, 25, 30, 35, 40, 45, 50, 55, 60, 65, 70, 75, 80, 85 or 90% of the total length of the frame part up to 10, 15, 20, 25, 30, 35, 40, 45, 50, 55, 60, 65, 70, 75, 80, 85, 90 or 95% of the total length of the frame part. The cross-structure can thus be arranged at the first end of the frame part (B=0%) or at a distance B from it. According to one embodiment, the boat guide is arranged in connection with the cross-structure. This thus applies to all distances B where appropriate, i.e. to B1, B2 etc.

According to a preferred embodiment, the boat guide is movably and rotatably coupled with the frame part, i.e. the boat guide is arranged to be both moved along the frame part (between its first end and second end) and to rotate around the frame part and around its own axis. The boat guide is thus preferably freely movable. The boat guide may be directly attached to the hull of the boat or to the frame part or it may be attached to it via a separate part or parts.

The distance D at which the first actuator is arranged to be coupled with the first frame part, from the first end of the first frame part, is preferably relative small, i.e. the first actuator is preferably arranged close to the first end of the frame part. It may for example be at a distance that is 1-5% of the total length of the frame part, or it may be at the first end of the frame part. When two actuators are used on one side of the frame (see below), the second actuator is preferably a bit further away from the end of the frame part, for example at a distance D2 (the first actuator being at a distance D1) that is 5-30% of the total length of the frame part.

The cross-structure is coupled with the frame part, i.e. it may be attached directly to the frame part, detachably or in a fixed manner. It may also be attached to the frame part via an attachment means if desired. The cross-structure may for example be coupled with the frame part in a manner that allows the cross-structure to be moved along the frame part as well as rotated around the frame part.

The device is arranged to be moved between a first position and a second position, by the use of the actuator. In this respect, by the first position is meant the position where the boat, when arranged in connection with the device, is on a storage device, i.e. lifted. The second position thus means the position where the boat, when arranged in connection with the device, is in water, i.e. launched. The frame can be moved between these two positions and in some embodiments, also fixed temporarily in an intermediate position between the first and second positions, as will be explained in more detail below. The device thus turns the boat around an axis that is perpendicular to the longitudinal axis of the boat, the longitudinal axis being defined by the longest dimension of the boat, i.e. from the bow to rear of the boat. A boat can be arranged in the device either way, i.e. bow first or rear first.

The present device is preferably used for boats having a length of 3-7 meters, and more preferably 4-6 meters. Any boat that is able to withstand the forces needed for tipping it over as described can be used with the present device. Moreover, the device itself is manufactured such that it withstands all static and dynamic forces that apply to it during use. The device is thus preferably mainly manufactured from metal, such as aluminium, steel or stainless steel.

Storage and transport of a boat upside down provides many advantages. For example, storage of the boat upside down minimizes risk of theft and vandalism during long storage periods. It also enables safe and easy servicing performed on the boat's outside hull, even to an extent where the hull and the keel can be optimized for different conditions. Furthermore, the actuator(s) of the device can be used for adjusting the trim system of the boat, i.e. the boat trim tabs can be adjusted with the actuator(s). According to a yet further embodiment, the actuator(s) of the device can be used for active transforming of the boat bottom e.g. from deeper v-hull to less deeper v-hull.

Furthermore, transportation of a boat upside down on a trailer can be done safely, using the present device. The transportation is safe because the boat will not drop or slip of the trailer, as may happen with conventional trailing of boats. Moreover, the load of the boat is distributed better as no point loads will exist. Due to the fact that the longitudinal center of gravity will be closer to the middle of boat length (as the motor will not be on transom during transport), the wheels of the trailer will be close to the middle of the trailer length, this way enabling ease and maneuverability in traffic. On the road, upside down trailing of boat will reduce fuel consumption since the air resistance will be reduced.

When a boat is transported using the present device, the outboard motor is preferably removed from the boat transom. This can suitable be done by using an arrangement for outboard motor positioning. According to one embodiment, the motor can be arranged safely under the boat, close to the trailers' wheel axle. In this embodiment, the motor can be placed on a cart arranged in the trailer. This cart is such that removal of it or the motor will not change the trailers longitudinal center of gravity, and advantageously the cart can also easily be moved onto a separate "motor holder" e.g. for winter storage inside. Alternatively, the cart can remain in the trailer and the motor removed from the cart for storage. According to another embodiment, the motor can be arranged on a bracket that is in turn attachable to the transom. According to yet another embodiment, the boat is equipped with a motor bracket that can be rotated. In this way, the motor can be turned around to be in its normal position even when the boat is arranged upside down. Hence the motor does not need to be removed. The trailer (or similar) is then equipped accordingly to enable rotating the motor, if required. This embodiment is believed to be suitable for small motors that do not contain motor oil.

The system of cart for motor also applies for fuel tank, battery and other fragile and heavy boating equipment. Indeed, further carts can be arranged on the trailer for these equipment, one for each equipment or one for more than one equipment. For example, the fuel tank can be equipped with wheels and the battery and hydraulic pump unit can be as a separate movable unit on wheels. Similar carts for motor and other devices can also be arranged on a dock or similar, if needed. The boat transom may also comprise an openable hatch for entering the equipment in the boat without the need to lift it.

The present device allows launching and lifting of a boat to be done in a more precise way, i.e. the boat will fit its trailer (or other construction) precisely. This minimizes the risk of damaging the boat and the trailer during lifting and launching of the boat. Moreover, launching and lifting can be done in a way that the trailer's wheel-bearings and lamps are not in contact with water. This naturally minimizes need for service of the trailer and risk of bearing breakages on the road.

Upside down transport and storage position further aids in keeping the boat both dry and clean. Cleaning of both the inside and the outside of the hull is easy since after lifting, the boat can easily be hosed clean with water. This can even be done when boat is in a vertical position, thus allowing dirt and water to flow out at the stern, hence making cleaning the inside of the hull even easier.

A yet further advantage of the present device is that the boating season can be extended since the boat can be launched onto thicker ice than with previously known devices. Indeed, ice is not as big a problem since the boat leaves the trailer bow in front (and not stern). Return to the trailer is always possible bow in front (breaking ice), then turning around and reverse with stern ahead. The boat can also be launched into more shallow water than in conventional launching of boat from a trailer. Launching and lifting is illustrated below in more detail in connection with the drawings.

The rotational axis of the present device is situated at the stern of the boat, or at the rear of the trailer (or e.g. at one side of the pier). The frame of the device can be attached to the boat in a way that the rotational axis of the device is situated on the top of the boat transom. The device can be attached to the boat with fastening means along the longitudinal frame part(s). Thus when turning the device, the attached boat is also rotated. The rotation is approximately 180□. Hence the boat is turned from upside down position to keel-side down position or vice versa.

According to an embodiment, the frame part is arranged such that when the device is used in connection with a boat, the frame part is either on the top side surface of the boat or outside the boat. In this latter case, it may be either in contact with the boat or there may be a small gap between the boat and the frame part. The frame may even be an integral part of the boat. According to yet another embodiment, the frame penetrates a hollow part of the hull or separate elements attached to hull, in the manner of a forklift.

According to an embodiment, the device comprises a second frame part, arranged essentially parallel to the first frame part and at a distance A from the first frame part. The distance A is preferably essentially identical to the width of the boat with which the device is to be used, as the frame parts are preferable arranged on the boat's sides. According to another embodiment, the second frame part comprises a second boat guide movably and rotatably arranged on the second frame part at a distance C2 from the first end of the second frame part. The distance C2 can be identical or different to the distance C1 mentioned above.

The device may also comprise more than two frame parts, although one or two are preferred. When more than two frame parts are used, two may be arranged on the sides of the boat and the other on the structure of the boat itself, i.e. as an integral part of the boat. The number of frame parts depends on the size of the boat, and typically one frame part is used for a small boat and two frame parts are used for a larger boat. The device is also equipped with at least one rotation allowing element, such as a bearing.

According to another embodiment, the device comprises a second cross-structure, arranged at a distance E from the first cross-structure and essentially parallel to the first cross-structure. The cross-structure can be in the form of a straight bar, and is thus arranged over the boat. The cross-structure can also have the form of hull of the boat, and hence be arranged below the boat. The cross-structure may extend from a frame part towards another frame part over the entire width of the boat or only part of it. For example, when a cross-structure having the shape of the hull of the boat is used, it may extend only on one side of the hull, i.e. not extend over the keel of the boat. The device may also comprise two cross-structures that are arranged on different frame parts, i.e. one cross-structure is attached to the first frame part and extends towards the second frame part and another cross-structure is attached to the second frame part and extends towards the first frame part. The device may also comprise any other number of cross-structures, such as three, four, five, six, seven or eight cross-structures. The cross-structures used can be identical or different. According to an embodiment, the frame may be equipped with diagonal supports for added mechanical strength.

The cross-structures can also be used for protection of the boat during storage. For example, a cover can be arranged to be support by the cross-structures alone, or the cross-structures can be combined with a support structure and then covered for protection of the boat.

According to an embodiment, the device comprises a third boat guide and a fourth boat guide, the third boat guide being arranged at a distance F1 from the first boat guide and the fourth boat guide being arranged at a distance F2 from the second boat guide. The device may also comprise more boat guides, such as three, five, six, seven or eight boat guides. The distances C1 and C2 are for example selected such that when one boat guide is used per frame part, the boat guides are arranged essentially in the middle of the boat, when seen in its driving direction. When two boat guides are used per frame part, the distances C1, C2, F1 and F2 may for example divide the length of the boat into three sections having approximately the same length. The further boat guides are arranged at distances C3, C4, C5, C6 etc. from the first end of the respective frame part. The distances C1, C3, C5 etc. are for one frame part and the distances C2, C4, C6 etc. are for the other frame part.

According to a preferred embodiment, all the boat guides are movably and rotatably arranged on the frame parts. The boat guides can be rotated, slid along the frame part and moved from outside of the boat to inside of the boat.

According to a preferred embodiment, at least a part of the boat guides are equipped with fenders. The boat guides can thus be used for protecting the boat against shocks with other boats or docks etc. As the boat guides are rotatable, the fenders can also be placed along the side of the boat in any position, such as vertical or horizontal. The boat guides can further be equipped with loops or other attaching construction at both ends, and can be spring-loaded attached to the frame part or an intermediate part between the boat guide and the frame part.

According to a further embodiment, the device comprises a second actuator arranged to be coupled with the second frame part, i.e. when two frame parts are used, each is equipped with one actuator. According to another embodiment, the device comprises a third actuator arranged to be coupled with the first frame part and a fourth actuator arranged to be coupled with the second frame part. The device thus comprises, in this embodiment, two actuators on both sides and coupled to both frame parts. The device could of course also comprise one actuator on one side and two on the other. According to one embodiment, the actuators are hydraulic cylinders. The actuators may also be mechanical structures, electric motors, pneumatic cylinders or a combination of these. The actuators preferably comprise also means for controlling the actuators, i.e. means for moving and stopping them. Preferably, only one means for controlling is used for all the actuators.

When hydraulic cylinders are used, they are preferably used in pairs (i.e. two hydraulic cylinders on each side). In this embodiment, a force is first needed to start and continue the rotation for approximately 90° (from horizontal to vertical position and a little further) and this is provided by a first hydraulic cylinder. Then a braking force is needed to slowly and controllably lower the boat and the device towards water or the storing device, and this is provided by a second hydraulic cylinder. In both cases the force needed must exceed gravity force.

The present device can be either manually or automatically operated. A combination of these is also possible, as well as use of auxiliary and safety equipment e.g. gas springs for aiding start and stop of rotation. The device may thus also be equipped with at least one unit providing power to the actuator, for example a hydraulic pump unit, which can be for example a hand pump or a powered unit.

The present description also relates to a system comprising
  a device for launching and lifting a boat according to the present description,
  a boat arranged along the first frame part,
  a storing device for the boat selected from the group consisting of a dock, a shore docking station and a boat trailer,
wherein the counterpart of the device for launching and lifting the boat is arranged on the storing device.

The system thus comprises the device as explained above as well as a boat arranged along at least the first frame part (as explained above; or in some embodiments, between two frame parts), as well as a storing device that may be any suitable storing device known per se.

According to an embodiment, the frame of the device for lifting and launching the boat is attached to the boat. Typically then the counterpart of the device is attached to the storing device. According to another embodiment, the whole device is attached to the storing device and the frame part functions also as a docking place for the boat. The counterpart can also be buoyantly attached to storing device for ease of attaching the boat. The present device may thus be arranged in connection with the boat or with the storing device, and the attachment may be removable or fixed. The actuators can be also fixed or removable, as desired.

When the storing device is a trailer, it may further comprise at least one support, preferably a first support and a second support arranged on either side of the trailer in its driving direction, and the support(s) is extendible from the boat trailer. The support is thus useful in supporting the trailer during launching and lifting of the boat, and thus avoiding tipping over of the trailer due to the change of the point of gravity of the system, i.e. the support balances the system during launching and lifting of the boat.

The support can be operated manually or automatically, and needed power can be hydraulic, mechanical, electric, pneumatic or a combination of these. The support may for example comprise pull-out supports and a locking device for trailer coupling. In order to save time at the ramp, the pull out supports can be pulled out before reversing the trailer to launch position. The vertical movement (supporting) can then be done when the trailer is at the launching position. If hydraulic means are used for supporting, then cylinders are, according to an embodiment, parallel connected taking into account depth differences and thus balancing itself. The trailer may also be equipped with means showing the correct level of trailer compared to water level.

A locking device can be integrated to the trailer coupling. This will support and prevent coupling from coming off the towing hook. It can also provide theft protection when the trailer is not in use.

According to an embodiment, the trailer further comprises means for transporting and storing an outboard motor. This embodiment will be explained in more detail below in connection with the drawings.

A removable tailgate may also be hinged from its top to the device. This removable tailgate then forms a practical extension of the boat while at the same time functioning as a sound attenuating element between the motor and the boat.

The embodiments and variants disclosed above in connection with the device apply mutatis mutandis to the system.

Compared with conventional trailing, the device and system described here brings many advantages. Instead of having one trailer for transporting material, and one for transporting a boat, these can now be combined, thus only one trailer is needed. One trailer occupies less space than two trailers, and the device described herein occupies even less space than a conventional boat trailer. This means in some cases that the boat including all equipment could fit into a garage where a conventional trailer does not fit.

The present device, which can also be called a movable tipping device, is also very versatile. Indeed, with some embodiments, heavy loads can easily be moved from trailer to boat as is explained above and below. Firstly the boat is launched, then the load is lifted to the boat using the device, after which the motor is installed. In the other end (e.g. an island with a pier), the process is inverse, thus enabling ease in logistics and transportation from shore to island. The device may also be used for lifting other equipment from the boat, such as heavy groceries, water tanks etc. Lowering of the boat on land is also possible with this device, if it is desired to be stored elsewhere than on the trailer. This frees the trailer's transport capacity and enables it to be used for other purposes.

For example, the present device can also be used for installation purposes, or tools may even be integrated to it, in order to perform work such as cutting of a hedge (when on trailer), or cutting of reedy shallow waters (when on boat). The device can further be used for other issues as well since it can be locked to different positions. When installed on a pier, it can be equipped with stairs, thus e.g. functioning as a jumping platform for diving into water. Alternatively, when locked to its outer position, it functions as pier extension, locking the boat to a certain "parking" position.

Furthermore, when the boat is stored outside upside down, there is no need for extra shelters or covers that could break. Indeed, with the present device, the boat can be locked as a compact unit with the motor and other equipment safely stored under the boat. During winter storage there is no damage from ice or cold, because a heater can be placed inside this compact and isolated unit (some boat hulls are filled with polyurethane/foam, hence isolated). Storage of the motor separately from boat, and servicing it on the trailer is also possible due to the design of the cart on which the motor is placed.

The present device can also be used for manufacturing a boat. In this manufacturing method, the structural beams of the hull of the boat are first arranged on the trailer (or similar device), upside down. A layer of metal is then added to form the outer hull of the boat. After turning the boat around, the inside of the boat can be equipped in a traditional manner (for example arranging insulation material, inner surface of the hull and equipment such as benches etc.).

The present device can also make it easier to launch the boat and enter it from land, as well as vice versa. The trailer can function as a walkthrough extension from a trailer-ramp to the boat. A removable hatch on the trailer floor can be placed between the boat and trailer in order to form a walk-in ramp to the boat.

Design of boat and tipping device is so that it enables tipping device to be rotated along its longitudinal axis, thus placing and attaching it upside down on boat. When upside down and hinged to boat, then tipping device rotates in relation to boat, thus enabling cutting work as earlier described.

Existing boat models and existing trailers can economically be combined using a device specially designed and adapted for this purpose, or the device, the trailer and the boat can be designed as a combination.

In order for a boat to be usable with the present device, most of its above deck-line equipment (for example a windshield) should be able to be turned down below deck-line. The motor is preferably installed on a bracket or extension, which can be solid or movable at the transom. The bracket can be seen as an adaptor which together with a counterpart (fastened to motor) couples the motor to the boat. A cart on the trailer allows easy installation of counterpart to bracket, as explained above. The motor can be lowered down, for example the counterpart can be snap-locked to the bracket. The technique can be different whether boat is to be used with trailer, shore docking station or pier. The motor is preferably also equipped with a construction that enables easy handling in conjunction with moving and coupling the motor to boat. Due to this technique even motors having over 100 horsepower can be used.

In a preferred embodiment, both the motor and the fuel tank and/or battery are attached to the boat (i.e. hinged) in such a manner that turning the boat upside down only requires some small steps when launching and lifting the boat. For example, these equipment can be positioned in a separate cradle (or an open top container) that allows them to be essentially bottom side down at all times. The motor bracket mentioned above can be hinged or otherwise rotatable in relation to the boat, thus allowing turning of the boat without having to disconnect the motor from the bracket or the bracket from the boat. This way, it is also possible to keep the control equipment of these devices (motor, battery etc.) constantly connected.

DETAILED DESCRIPTION OF THE DRAWINGS

FIG. 1 illustrates the device 1 according to an embodiment, detailed as a side-view. The device 1 comprises a first frame part 4 having a first end 4a and a second end 4b. The frame part is attached to boat with a number of fastening means 18, 18' and 18". The device also comprises two cross-structures 12, 13, which are straight bars in this embodiment, and thus perpendicular to the plane of the paper. The cross-structures 12, 13 are arranged at a distance E from one another. The distance B1 between the cross-structure 12 and the first end 4a is also shown. The device also comprises two boat guides 10 and 11, of which the boat guide 10 is shown in a vertical position and it is arranged at a distance C1 from the first end 4a. The boat guide 11 is shown in a horizontal position, i.e. it is parallel to the frame part 4, and it is attached to the frame at a point that is at a distance C3 from the first end 4a.

The device still further comprises two hydraulic cylinders 7 and 8, coupled with the frame part 4. The hydraulic cylinder 7 is directly attached to the frame part 4, at a distance D (here also D2) from the first end 4a of the frame part 4, and the hydraulic cylinder 8 is attached to a stern lock structure 14 (i.e. essentially at a position that is at the same level than the first end 4a of the frame part 4, the distance D1 being thus 0% of the total length of the frame part). The device is also equipped with a rotation allowing element, such as a bearing 9. In this embodiment, the frame further comprises frame reinforcement 5 in the form of a plate and beam, and a stern locking or lifting structure 14. The frame reinforcement can also have any other shape and/or size, such as triangular. The device is, in this embodiment, also equipped with integrated shock absorbers 15, 15' and 15".

The Figure also shows a counterpart 6 to which the frame is attached and hinged to via the means for attachment comprising parts 16, 17 and 19. The part 16 is designed to be arranged inside the part 19 (i.e. part 19 is hollow) and the parts 16 and 19 are fixed to each other via fastening means 17, such as a peg.

The counterpart also includes elements 20, 20' where the hydraulic cylinders 7, 8 can be attached. The elements 20, 20' can be for example holes into which the cylinders are attached via pegs or similar.

Figure 2:
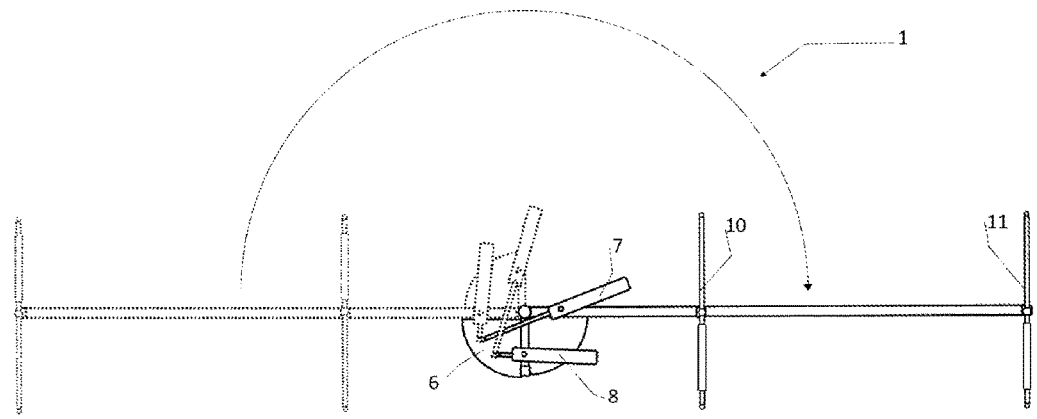
FIG. 2 illustrates as a side-view the movement of the device 1 as shown in the embodiment of FIG. 1.

FIG. 2 illustrates as a side-view the movement of the device 1 as shown in the embodiment of FIG. 1. The motion of the device is shown with the curved arrow, while the boat and the storing device have been omitted for sake of clarity. The device drawn with dotted lines is at the starting point of launching, whereas the device drawn with solid lines shows the end position. The device drawn with dotted line thus shows the tipping device in a position where the boat would be upside down above the frame, and storing device would be under the frame. The change of position is obtained with the help of the hydraulic cylinders 7 and 8, attached to the counterpart 6 and the frame. Both boat guides 10 and 11 are shown in a vertical position.

During movement, the hydraulic cylinder 7 is providing the force needed for starting the rotation, whereas the cylinder 8 is either helping (a two way cylinder), or "bleeding" counter pressure out through return valve. After a vertical position has been passed, lowering down to horizontal position is enabled by regulating the same return valve of cylinder 8.

Figure 3:
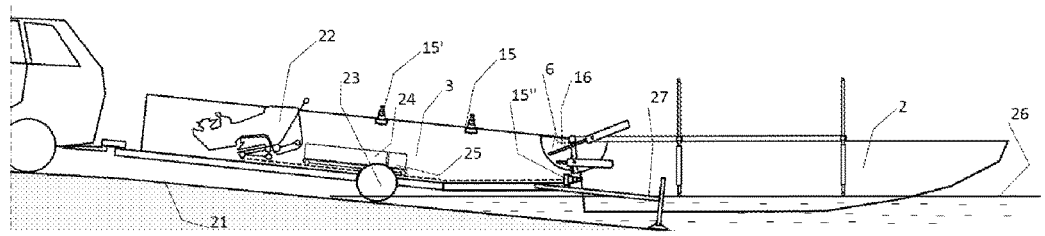
FIG. 3 illustrates as a side-view boat launching utilizing a device according to an embodiment.

FIG. 3 illustrates a side-view of boat launching utilizing the device. In this Figure the device is in same position as shown in solid lines in FIG. 2, i.e. outermost position during launch of a boat 2 from a trailer 3 at a boat launching ramp 21. An outboard motor 22 has, in an earlier stage, been moved from transporting position (above the wheel 23 axis) closer to the front of the trailer in order to balance the system better. In case the trailer has two wheel axes, the motor can be moved either closer to the front of the trailer or between the two axes. The launching of the boat is finalized, i.e. the boat has been rotated almost 180 □ to its keel down position. Equipping of the boat starts after this by moving the motor, as well as a tank 24 and a battery 25. These have also been located in an optimal, locked position in the trailer during transport. The motor and respective equipment are shown for ease of understanding only (they are situated between the two longitudinal sidewalls of the trailer). The shock absorbers integrated to the trailer (and not the device) can also be seen in this Figure: two shock absorbers 15, 15' on trailer top, and one shock absorber 15" on trailer back.

During launch and equipping all non-waterproof trailer equipment are situated above water level 26, only pull-out supports 27 have been pulled out and are in contact with water. In FIG. 3, the counterpart 6 is attached to the trailer, and the device is hinged to it via part 16.

Figure 4:
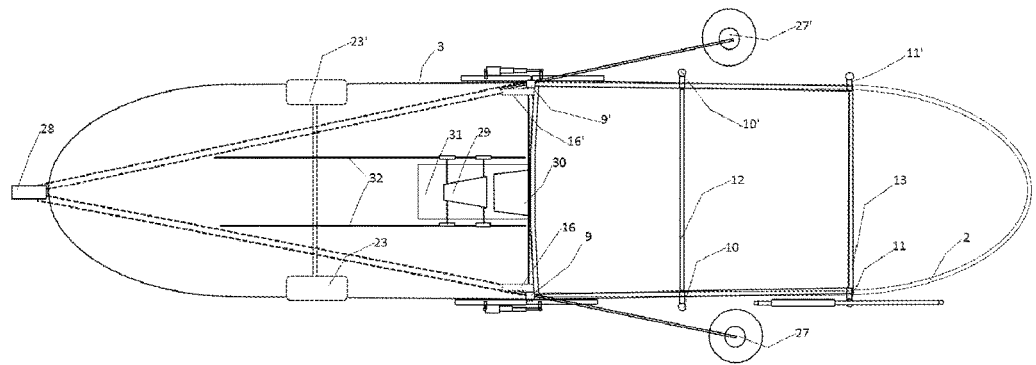
FIG. 4 shows a top-view of a device according to an embodiment.

FIG. 4 shows a top-view of the device hinged to trailer 3 with parts 16 and 16'. The boat 2 and the device 1 are in the outermost position as in FIG. 3. The trailer support and balancing means i.e. pull-out supports 27, 27', the trailer wheels 23, 23', and the trailer coupling 28 are shown. Also shown are the device bearings 9, 9', boat guides 10, 10', 11 and 11', and cross-structures 12, 13.

The Figure also shows some necessary motor moving and installation parts. When on trailer, the motor is attached to a cart 29. The cart moves on the trailer on a pair of linear guides or rails 32. At the boat transom is a bracket 30 for motor installation. There are also an opening or hatch 31 on the trailer floor which can be removed or opened during installation.

Figure 5:
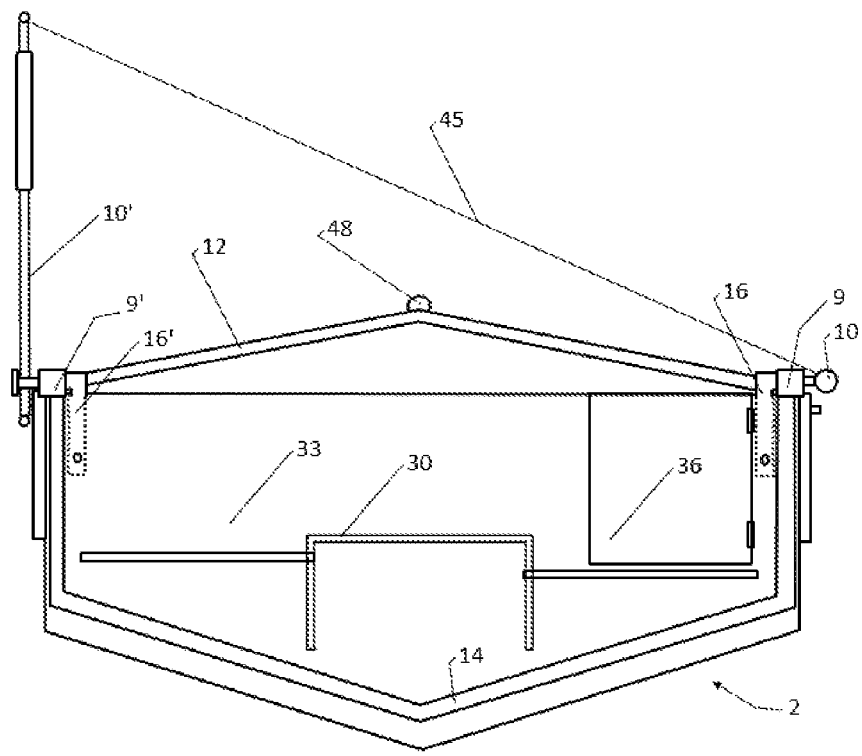
FIG. 5 illustrates a back-view of a device according to an embodiment.

FIG. 5 illustrates a back-view of device hinged to boat 2 with hinge parts 16 and 16', at the transom 33. The cross-structure 12, bearings 9, 9' and boat guides 10 and 10' are also shown. The hinge parts may be arranged either inside or outside of the bearings. The boat guide 10 has been rotated 90L, so that it now functions as outside hand rail. The Figure further shows a motor installation bracket 30, a door 36 at transom, a stern lift structure 14 and a roof 45. The roof 45 may be made for example of canvas, and supported by a longitudinal support 48.

Figure 6A:
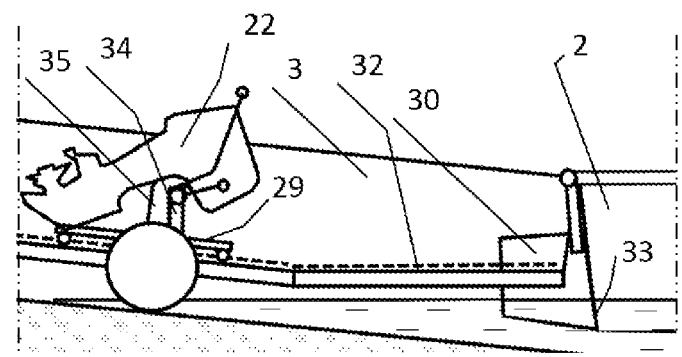
FIG. 6a-6c illustrate an installation method of a motor to a boat 2 from a trailer 3, according to an embodiment.
Figure 6B:
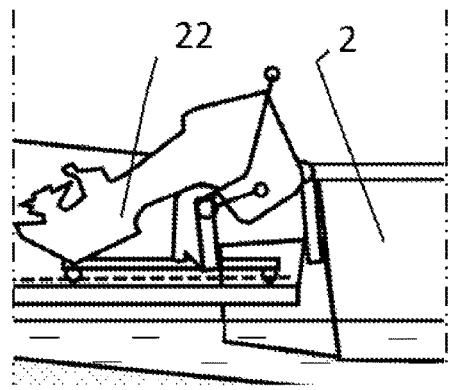
Figure 6C:
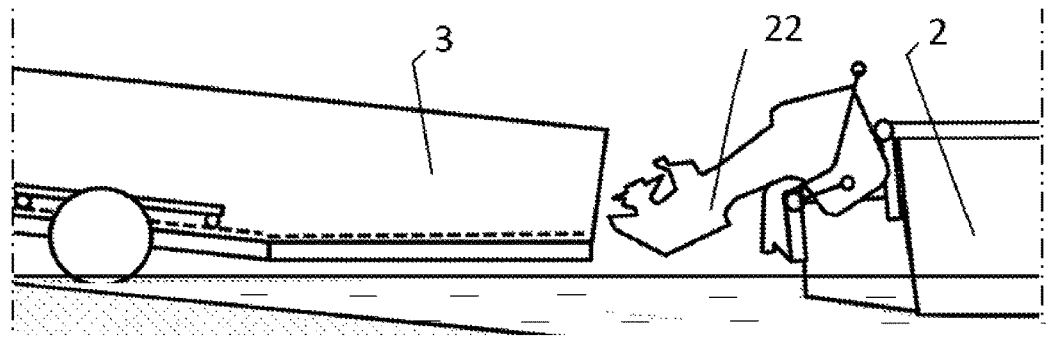
Figure 7:
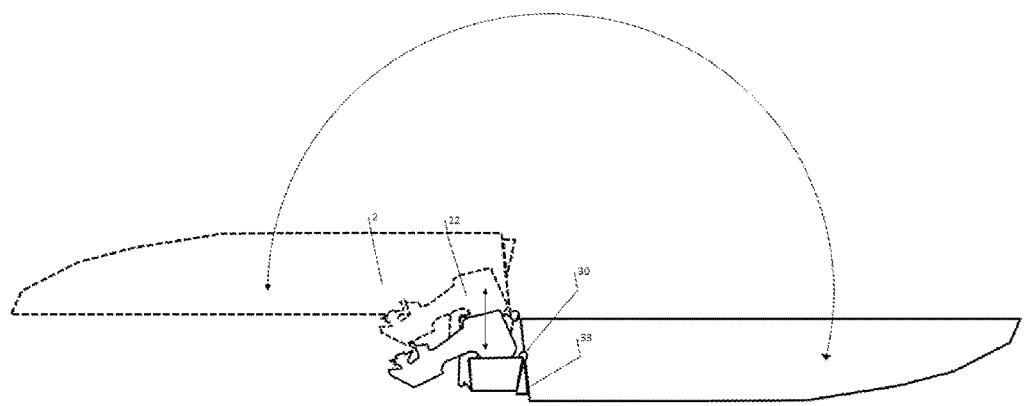
FIG. 7 illustrates an installation method according to an embodiment.

FIGS. 6a to 6c illustrate installation of a motor 22 to the boat 2 from the trailer 3 according to an embodiment. Indeed, FIGS. 6a to 6c show how the motor is moved inside the trailer on a cart 29. The cart 29 is moved in longitudinal direction either manually or automatically on a pair of linear guides or rails 32. The motor can be attached to auxiliary adaptor frame 34 by a mounting bracket 35, which adaptor frame 34 is attached to the cart. The motor will be installed on a separate bracket 30 situated on a transom 33, or directly to the transom. An integrated auxiliary adaptor frame 34 on the motor is used while moving the motor to final position. The motor is lowered down to, or tilted in order to snap-lock the motor to the bracket and to remove the cart. The bracket and adaptor frame can be designed such that easy, fast and solid installation of the motor to the boat is achieved. The adaptor frame and the bracket can be designed so that a versatile use of it is possible, e.g. it can be used as a swimming platform, a sporting utility and/or a light pole. In FIG. 7, it is shown how the motor 22 remains in the same position while the boat 2 is turned upside down or vice versa (the two positions of the boat are shown in solid and dotted lines as explained above). The motor 22 is installed on a separate bracket 30 situated on a transom 33, and the bracket 30 can be moved in vertical direction as shown by the arrow or tilted or rotated to final position to the transom.

Figure 8:
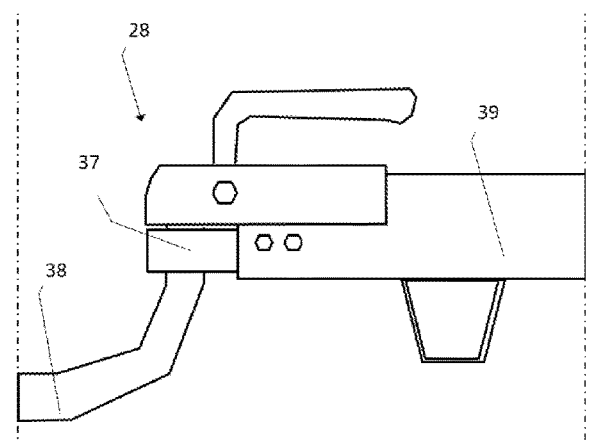
FIG. 8 illustrates a trailer to car coupling according to an embodiment.

FIG. 8 illustrates a trailer to car coupling 28 with an integrated locking device 37. The locking device is used at the ramp in order for the trailer not to lift up from a towing hook 38. The locking device can be moved and locked in longitudinal and/or horizontal direction inside the trailer frame beam 39. It can also function as an anti-theft device since the trailer cannot be hooked up to towing hook while the trailer is not in use and the lock is on.

Figure 9A:
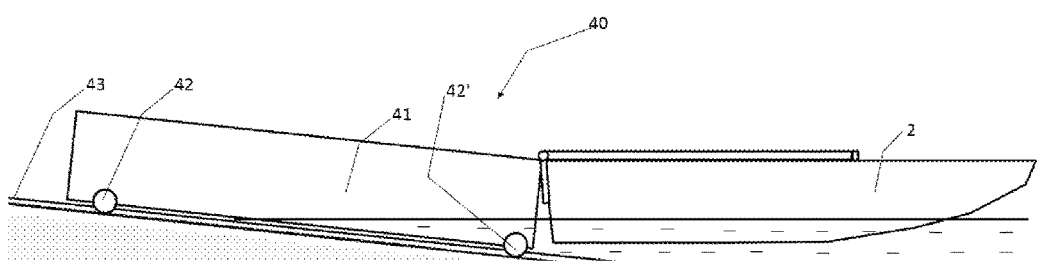
FIG. 9a-9b illustrate a storage platform for storing a boat including a device according to an embodiment.
Figure 9B:
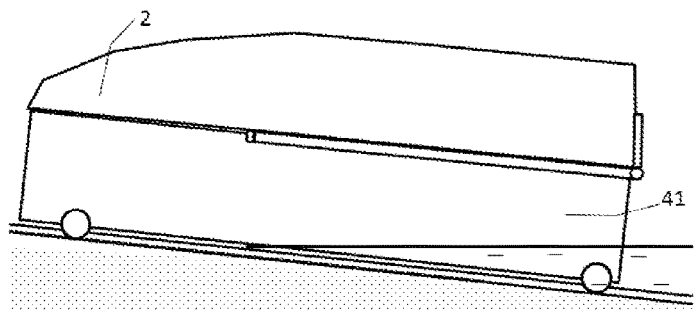

FIGS. 9a and 9b illustrate a storage platform for storing a boat 2 including a device according to this description, which storage platform in this case is a so called shore docking station 40. The shore docking station typically consist of a cart 41 on wheel-axes 42, 42'. The entity runs on a pair of rails 43. Due to the function of the device, the cart will form a practical space under the boat for stowing of equipment. The rails will balance and support the system, and they can be fastened to rock or beach with fastening devices. Certain length rails can be connected in angle for side supporting purpose. FIG. 9a shows the situation before lifting and FIG. 9b shows situation when lifting is finished.

Figure 10A:
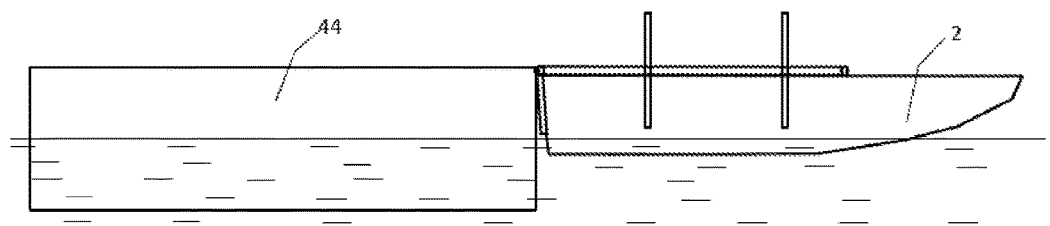
FIG. 10a-10c illustrate a system according to an embodiment.
Figure 10B:
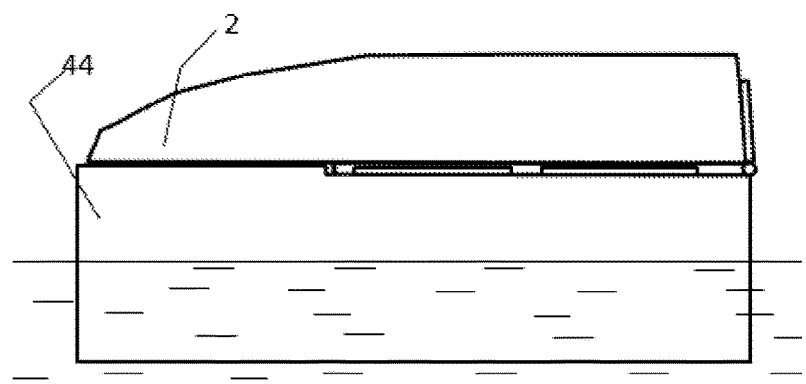
Figure 10C:
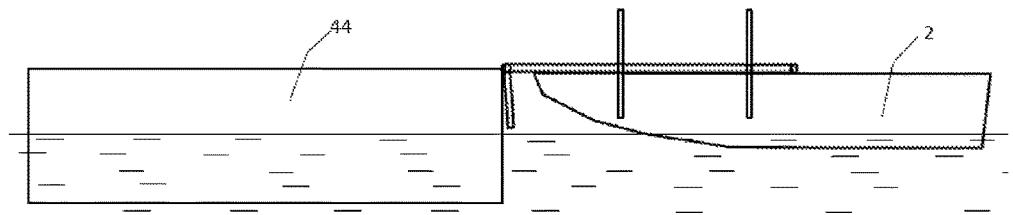

FIGS. 10a to 10c illustrate a solution where the device 1 and a concrete pontoon or element pier 44 have been combined. These two can be combined so that the pier functions as a storage platform for the boat 2. In this embodiment, the counterpart is thus arranged on the pontoon or pier. The boat can be arranged in the device either way, as shown in FIGS. 10a and 10c.

Figure 11:
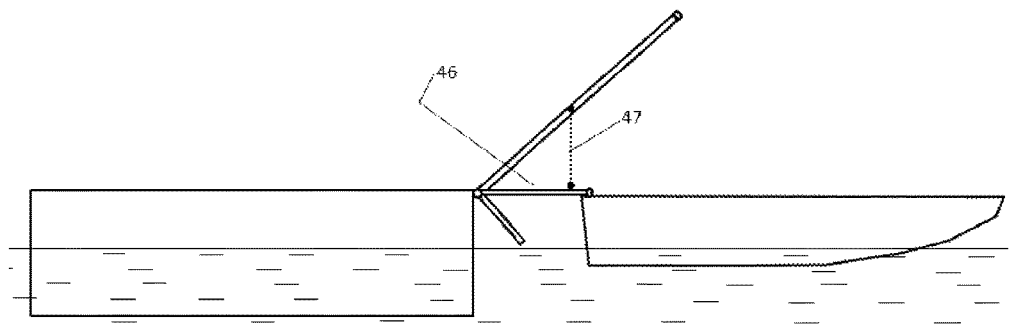
FIG. 11 illustrates a use of the device according to an embodiment.

FIG. 11 shows how equipment and motor can be lifted onto the pier with the device, using one of the cross-structures and a lifting belt 47, while also using an additional support 46.

Figure 12:
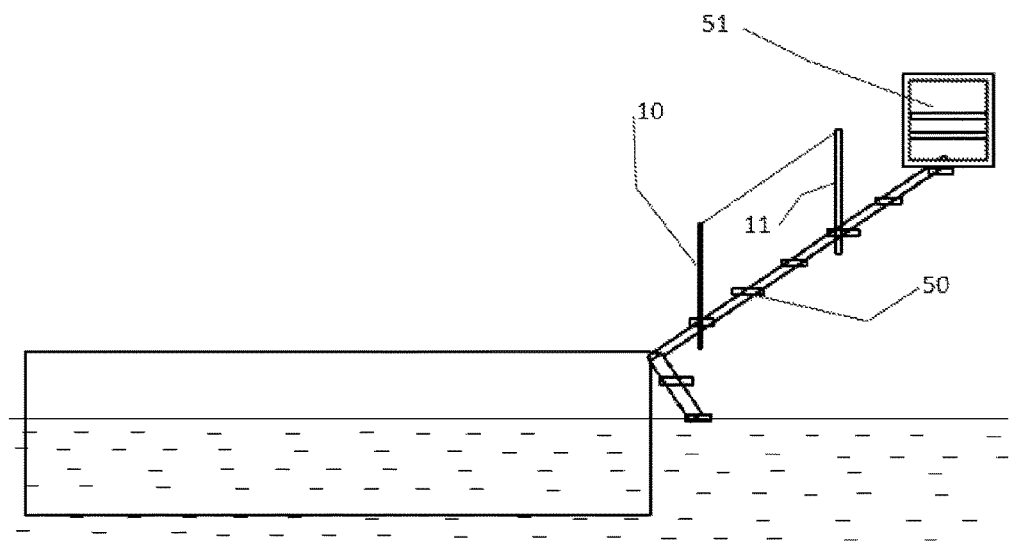
FIG. 12 illustrates another use of the device according to an embodiment.

FIG. 12 illustrates a further use of the device, in conjunction with a pier. The Figure shows use of the device as converted to a jumping platform. Stairs 50 and a platform 51 have been mounted onto the device frame. Due to the design of the frame, stairs from water up to pier, as well as stairs to the platform are formed. The boat guides 10 and 11 are used for supporting a handrail or a rope.

Figure 13:
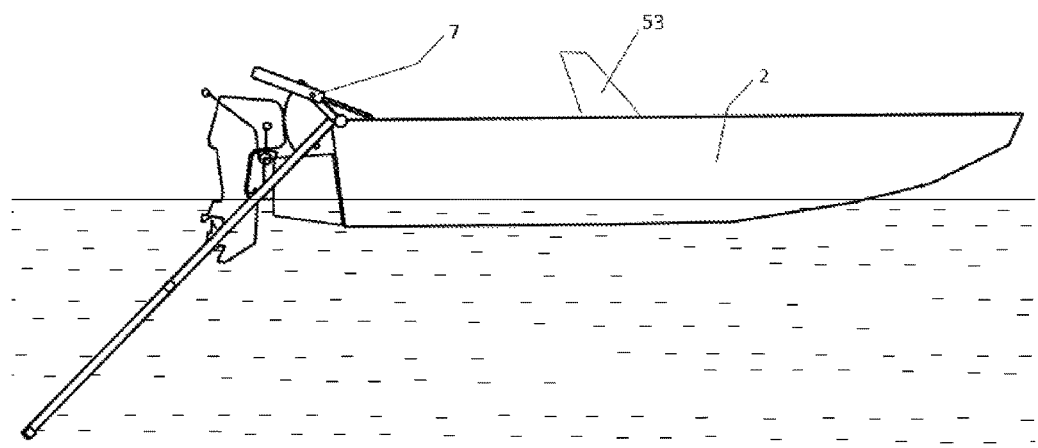
FIG. 13 illustrates a further use of the device according to an embodiment.
Figure 14:
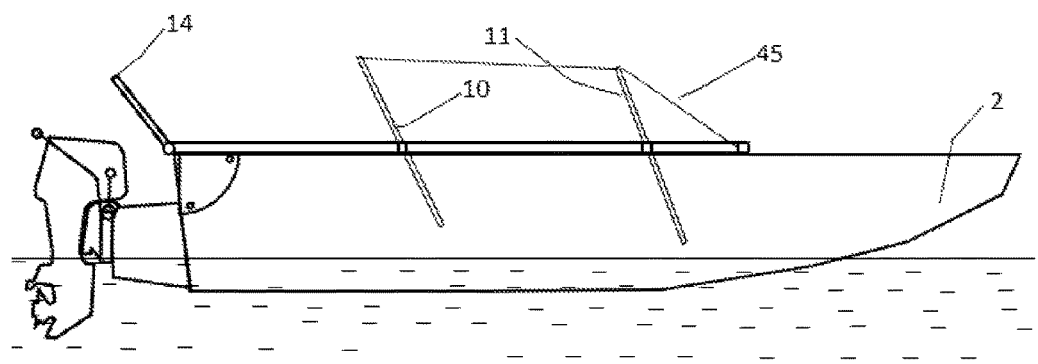
FIG. 14 illustrates a yet further use of the device according to an embodiment.
Figure 15:
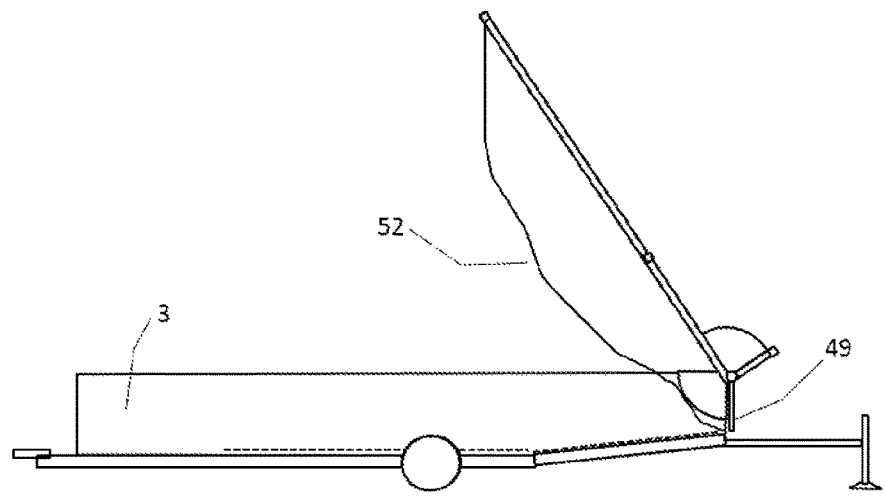
FIG. 15 illustrates another use of the device according to an embodiment.

FIGS. 13 to 15 illustrate further uses of the device. In FIG. 13, the frame part, hinged to boat 2, is used for underwater activities. After attaching cutting tools, it can be used while cutting reed in shallow waters. The hydraulic cylinder 7 is attached from one end to the boat's hull. Thus by operating the cylinder, the depth of the frame and cutting tool can be controlled. In this Figure a windshield 53 is also shown. The windshield can be removed or tilted down below deck-line when storing and transporting the boat.

FIG. 14 illustrates how a roof 45 (made for example from canvas) is held up by attaching it to the end of the boat guides 10, 11. By moving and rotating the boat guides, different roof layouts are achieved. Thus a roof suitable for speed boating, for rain or sun protection, or even harbor-cover can be formed since the roof includes side, front and back pieces. The device's stern lock structure 14, which is movable, is suitable for attaching for example fishing and sporting gear.

FIG. 15 shows use of the device on a trailer 3, with a tarpaulin 52 connected to it. Dumping of e.g. garden waste, by using the device, saves time at the dump tip. A tailgate 49, hinged to the device, opens when waste pushes through it.

Figure 16:
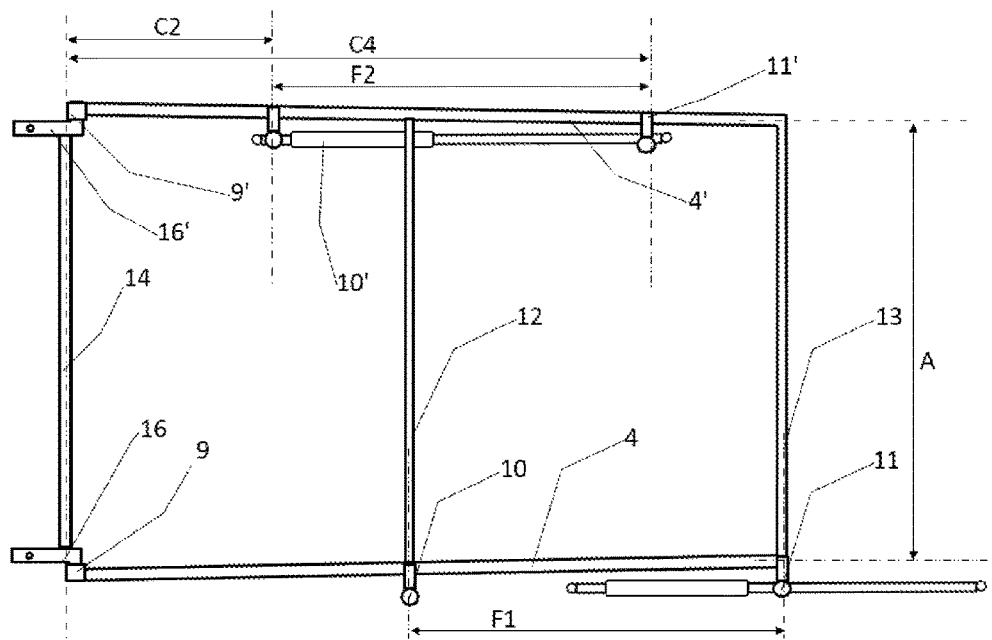
FIG. 16 illustrates a device according to an embodiment, seen from the top, without the counterpart.

FIG. 16 illustrates a device according to an embodiment, seen from the top. The Figure shows boat guides 10, 10', 11 and 11', cross-structures 12, 13 and 14 and attachment means 16 and 16'. The boat guides are shown as turned and moved to different locations and positions, namely boat guide 10 is vertically outside the hull of a boat (not shown), boat guide 10' is horizontally inside hull and from end attached to a support, boat guide 11 is outside the hull horizontally and boat guide 11' is vertically inside hull. The boat guides 10' and 11' have been moved longitudinally with respect to boat guides 10 and 11 and coupled together. The Figure also shows the distance A between two frame parts 4 and 4' as well as the distances F1 and F2 between two boat guides 10, 11 and 10', 11'.

Figure 17A:
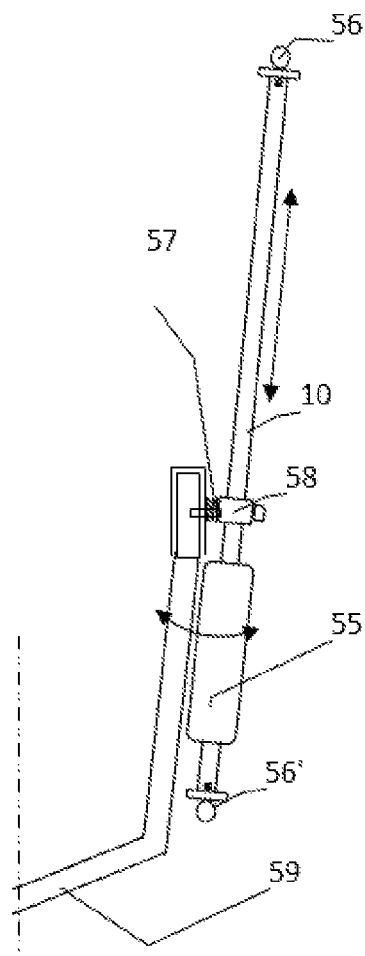
FIG. 17a-17b illustrate some details of a boat guide according to an embodiment.
Figure 17B:
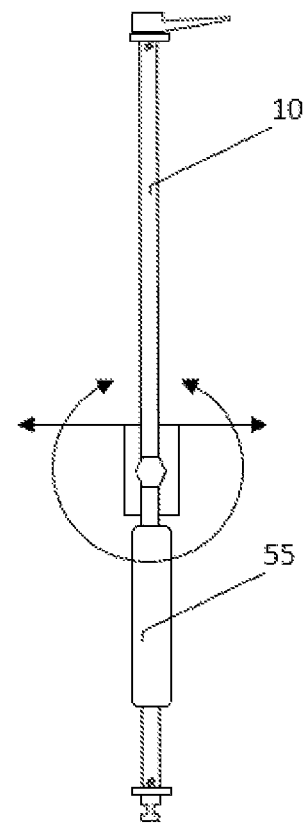

FIGS. 17a and 17b illustrate some details of a boat guide according to an embodiment, shown as different side views. The boat guide 10 is shown. It is equipped with a fender 55 that can be movable along the boat guide as well as rotate around the boat guide. The boat guide 10 may also be made floatable. The boat guide 10 is connected with the hull 59 via an attachment means 58. The attachment means 58 is equipped with a spring 57 to absorb shocks. Both ends of the boat guide are equipped with end stoppers 56, 56', so as to avoid losing the boat guide. The boat guide is preferably movable and rotatable with respect to the attachment means 58, in all directions. It can for example thus be loosened and tightened on the attachment means. It may have an infinite amount of locking positions or a limited amount of locking positions, such as locking positions in 45 □ segments. The attachment means may also be such that it can be turned around so that boat guide is situated inside the boat. The arrows show the different possible movements of the boat guide.

The invention claimed is:

1. A device for launching and lifting a boat, comprising a frame comprising
    at least a first frame part (4) having a first end and a second end,
    at least a first cross-structure (12) coupled with the first frame part (4) essentially perpendicular to the first frame part and at a distance B1 from the first end of the first frame part,
    a stern lifting structure (14) attached to the first end of the first frame part (4),
    at least a first actuator (7) arranged to be coupled with the first frame part (4) at a distance D from the first end of the first frame part,
    a second actuator (8) arranged to be coupled to the stern lifting structure,
    at least one counterpart (6) attached to the first end of the frame part,
    wherein the first actuator (7) has a first end directly coupled to the first frame part at the distance D from the first end of the first frame part, and a second end directly coupled to the counterpart (6) for enabling a lifting movement of the frame between a first position or a second position, and an intermediate position,
    wherein the second actuator (8) has a first end directly coupled to the stern lifting structure, and a second end directly coupled to the counterpart (6) for enabling a braking movement of the frame between the intermediate position and the first or second position,
    and wherein the device is arranged to turn the boat through the first, intermediate, and second positions, or through the second, intermediate, and first positions, around a rotational axis that is perpendicular to a longitudinal axis of the boat, the frame of the device is attachable to the boat in a way that the rotational axis of the device is situated on a top of the boat transom, and the rotation is approximately 180°.

2. The device according to claim 1, wherein the frame comprises at least a first boat guide (10) coupled with the first frame part (4) at a distance C1 from the first end of the first frame part.

3. The device according to claim 2, further comprising a second frame part (4'), arranged essentially parallel to the first frame part (4) and at a distance A from the first frame part, and a second boat guide (10') arranged on the second frame part (4') at a distance C2 from a first end of the second frame part].

4. The device according to claim 3, further comprising a third actuator (7') configured to be coupled with the second frame part (4'), and a fourth actuator (8') configured to be coupled with the stern lifting structure (14).

5. The device according to claim 4, wherein the actuators are hydraulic cylinders.

6. The device according to claim 4, wherein the actuators are pneumatic cylinders.

7. The device according to claim 4, wherein the actuators are electric motors.

8. The device according to claim 3, wherein at least part of the first and second boat guides are equipped with fenders.

9. The device according to claim 2, wherein the first boat guide and an optional second boat guide are arranged movably and rotatably on the frame part or frame parts.

10. The device according to claim 1 further comprising a second cross-structure (13), arranged at a distance E from the first cross-structure (12) and essentially parallel to the first cross-structure.

11. The device according to claim 1, wherein the intermediate position is a vertical position.

12. A system comprising
    a device for launching and lifting a boat, the device comprising a frame having
        at least a first frame part (4) having a first end and a second end,
        at least a first cross-structure (12) coupled with the first frame part (4) essentially perpendicular to the first frame part and at a distance B1 from the first end of the first frame part,
        a stern lifting structure (14) attached to the first end of the first frame part (4),
    at least a first actuator (7) arranged to be coupled with the first frame part (4) at a distance D from the first end of the first frame part,
    a second actuator (8) arranged to be coupled to the stern lifting structure,
    at least one counterpart (6) attached to the first end of the frame part,
    wherein the first actuator (7) has a first end directly coupled to the first frame part at the distance D from the first end of the first frame part, and a second end directly coupled to the counterpart (6) for enabling a lifting movement of the frame between a first position or a second position and an intermediate position, and the second actuator (8) has a first end directly coupled to the stern lifting structure, and a second end directly coupled to the counterpart (6) for enabling a braking movement of the frame between the intermediate position and the first or second position,
    the boat (2) arranged along the first frame part (4),
    a storing device selected from the group consisting of a dock (44), a shore docking station (40) and a boat trailer (3),
    wherein the counterpart (6) of the device for launching and lifting the boat is arranged on the storing device,
    and wherein the device is arranged to turn the boat through the first, intermediate, and second positions, or through the second, intermediate, and first positions, around a rotational axis that is perpendicular to a longitudinal axis of the boat, the frame of the device is attachable to the boat in a way that the rotational axis of the device is situated on a top of the boat transom, and the rotation is approximately 180°.

13. The system according to claim 12, wherein the trailer further comprises means (29, 30, 34) for transporting and storing an outboard motor.

14. The system according to claim 12, wherein the frame comprises at least a first boat guide (10) coupled with the first frame part (4) at a distance C1 from the first end of the first frame part.

15. The system according to claim 12, wherein the intermediate position is a vertical position.

16. The system according to claim 12, wherein the actuators are hydraulic cylinders.

17. The system according to claim 12, wherein the actuators are pneumatic cylinders.

18. The system according to claim 12, wherein the actuators are electric motors.

* * * * *